US012793474B2

(12) United States Patent
Mesa et al.

(10) Patent No.: US 12,793,474 B2
(45) Date of Patent: Nov. 10, 2026

(54) AUTOMOTIVE APPLICATIONS OF DISTRIBUTED FIBER OPTIC SENSING

(71) Applicant: Torc Robotics, Inc., Blacksburg, VA (US)

(72) Inventors: Carlos Mesa, Spring, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 103 days.

(21) Appl. No.: 18/927,421

(22) Filed: Oct. 25, 2024

(65) Prior Publication Data

US 2026/0120522 A1 Apr. 30, 2026

(51) Int. Cl.
*G07C 5/00* (2006.01)
*H04B 10/07* (2013.01)

(52) U.S. Cl.
CPC ............. *G07C 5/008* (2013.01); *H04B 10/07* (2013.01)

(58) Field of Classification Search
CPC ...... G07C 5/08; G07C 5/0816; G07C 5/0841; G07C 5/008; H04B 10/07; H04B 10/079; H04B 10/0791; H04B 10/0795; H04B 2210/07; B60W 50/0205; B60W 2050/021; B60W 2420/22; B60W 2420/406; B60W 2422/95
See application file for complete search history.

(56) References Cited

U.S. PATENT DOCUMENTS

| | | | | |
|---|---|---|---|---|
| 9,311,821 | B2 | 4/2016 | Melum et al. | |
| 10,055,903 | B2 * | 8/2018 | Koons | G07C 5/08 |
| 11,060,950 | B1 * | 7/2021 | Xia | G01M 11/3145 |
| 11,327,179 | B2 | 5/2022 | McKeown et al. | |
| 2014/0111326 | A1 * | 4/2014 | Borisenko | G01M 17/02 340/447 |
| 2020/0294401 | A1 * | 9/2020 | Kerecsen | G08G 1/205 |
| 2023/0211746 | A1 * | 7/2023 | Delev | B60R 21/0136 340/436 |

FOREIGN PATENT DOCUMENTS

WO WO-2008047358 A2 * 4/2008 ........... B60N 2/0025

* cited by examiner

*Primary Examiner* — Brandon Z Willis
(74) *Attorney, Agent, or Firm* — McCarter & English, LLP

(57) ABSTRACT

In one aspect, the disclosed method includes receiving a request to initiate a monitoring session associated with an autonomous vehicle and initializing a monitoring station fixed at a location within the autonomous vehicle. The method may further include receiving data associated with a sensor monitored by the monitoring station. The method may further include transmitting the data, and when received by the monitoring station, the monitoring station analyzes the data for elements of data that do not meet a threshold requirement associated with the data. The method may further include receiving an alert indicating that the location within the autonomous vehicle associated with a set of data that does not meet the threshold requirements. The method may further include transmitting a notification to a device associated with the autonomous vehicle, where the notification includes the location.

17 Claims, 5 Drawing Sheets

100

AUTOMOTIVE APPLICATIONS OF DISTRIBUTED FIBER OPTIC SENSING

TECHNICAL FIELD

The field of the disclosure relates generally to autonomous vehicles and, more specifically, to the use of fiber optic cables for monitoring components of autonomous vehicles.

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Distributed fiber optic sensing represent a significant advancement in sensing technology, leveraging the inherent properties of optical fibers to measure various physical parameters such as temperature, strain, pressure, and vibration. These fiber optic cables utilize the principles of light transmission, including changes in light intensity, phase, wavelength, or polarization, as a means to detect and quantify external stimuli. Unlike traditional electrical sensors, fiber optic cables offer several advantages, including immunity to electromagnetic interference, high sensitivity, and the ability to operate in harsh environments. With applications spanning across structural health monitoring, environmental sensing, and security systems, fiber optic cables are integral to modern infrastructure and industrial systems, providing accurate, real-time data for critical decision-making processes.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed computer-implemented method includes receiving a request to initiate a monitoring session associated with an autonomous vehicle and initializing a monitoring station fixed at a location within the autonomous vehicle. The monitoring station may be configured to process data from a sensor. The method may further include receiving data associated with the sensor monitored by the monitoring station. The method may further include transmitting the data, and when received by the monitoring station, the monitoring station analyzes the data for elements of data that do not meet a threshold requirement associated with the data. The method may further include receiving an alert indicating that the location within the autonomous vehicle associated with a set of data that does not meet the threshold requirements. The method may further include transmitting a notification to a device associated with the autonomous vehicle, where the notification includes the location.

In another aspect, the disclosed computer-implemented method may also include where the sensor includes a fiber optic cable and the monitoring station is fixed along the fiber optic cable. The data may be indicative of a temperature. The data may be indicative of a strain measurement. The fiber optic cable may include one or more points of interest over a length of the fiber optic cable, where the points of interest may be associated with a distance from at least one monitoring station. The computer-implemented method may also include generating a monitoring framework for the one or more points of interest. The monitoring framework may include a measurement threshold associated with a respective point of interest and the distance associated with the respective point of interest. The computer-implemented method may further include receiving calibration data from the monitoring station associated with the fiber optic cable, and calibrating the fiber optic cable and the monitoring station based on the calibration data. Other technical features may be readily apparent to one skilled in the art from the following figures, descriptions, and claims.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
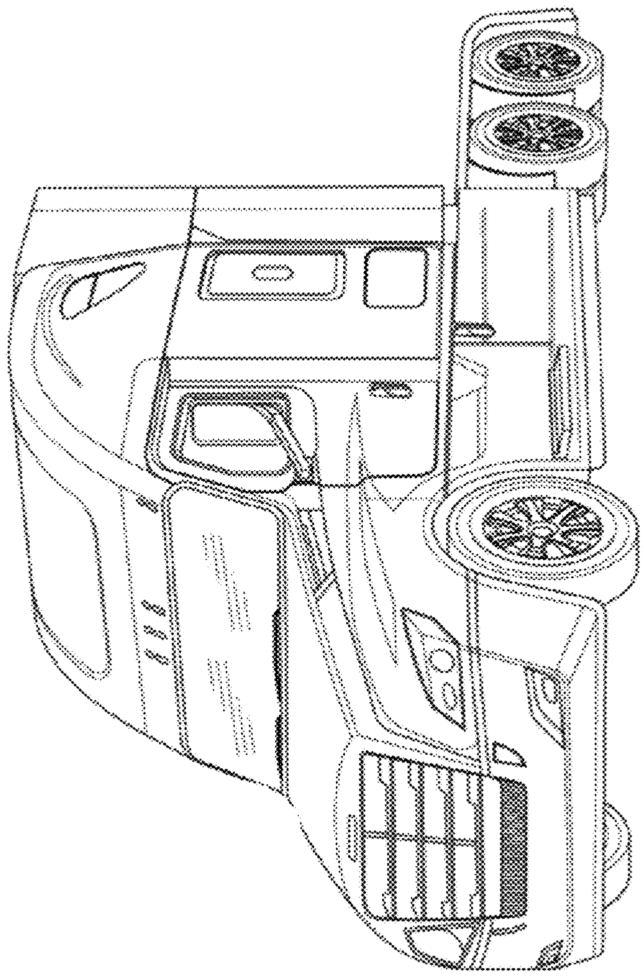
FIG. 1. is a schematic view of an example autonomous truck according to some aspects of the present disclosure.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Autonomous vehicles often are operated using large amounts of computing power and components, often resulting in a need to monitor components to ensure proper functioning. Sensors, such as thermistors or other thermometer devices, often exhibit excess latency or low reliability. There exists a need in the art to integrate distributed fiber optic sensing into autonomous vehicles to efficiently and effectively monitor components of the autonomous vehicle to anticipate issues (structural, hardware, and/or software issues) that may impact functionality of the autonomous vehicle. Distributed Fiber Optic Sensing (DFOS) operates by leveraging the inherent properties of light traveling through an optical fiber to detect changes in environmental conditions along the fiber's length. In DFOS, light is transmitted into the fiber and interacts with the fiber's core material, undergoing phenomena such as Rayleigh, Brillouin, or Raman scattering. These interactions produce backscattered light signals, which are analyzed to measure localized changes in temperature, strain, or vibration at precise points along the fiber. By employing Optical Time Domain Reflectometry (OTDR) or Optical Frequency Domain Reflectometry (OFDR), the system can determine the exact location and magnitude of these variations based on the time delay or frequency shift of the backscattered signals, with spatial resolution down to a few meters or even centimeters, depending on the system configuration.

Further, Fiber optic cables configurations used for DFOS are sensitive, low-latency, and reliable in high-temperature or high stress environments. By running a fiber optic cable throughout the cabin, hood, mechanical components, computing components, etc., temperatures and/or strain present within an autonomous vehicle can be constantly measured and analyzed to ensure proper performance of the autonomous vehicle. In addition to the reliability of DFOS configurations, the sensing process is continuous, with the entire fiber optic cable acting as a distributed sensor. The light source, typically a laser, injects pulses into the fiber, and the backscattered light is captured and processed by photodetectors and signal analyzers to extract information about the environmental changes affecting the fiber. The optical fiber can detect multiple parameters simultaneously, and by using advanced algorithms, the system differentiates between temperature and strain effects. The fiber optic cable, in conjunction with monitoring stations and/or a network terminal, may monitor temperatures within an autonomous vehicle and notify a central computing unit if a temperature is too high in a particular area. For example, monitoring stations may be positions near computers, cameras, Internal Measurement Units (IMUs), engines, any combination thereof, or the like, and may notify a central computer to reduce the speed of the vehicle, increase power to cooling fans, or another similar heat mitigation tactic.

FIG. 1. is a schematic view of an example autonomous truck according to some aspects of the present disclosure. FIG. 1 illustrates a vehicle 100, such as a truck that may be conventionally connected to a single or tandem trailer to transport the trailer (not shown) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
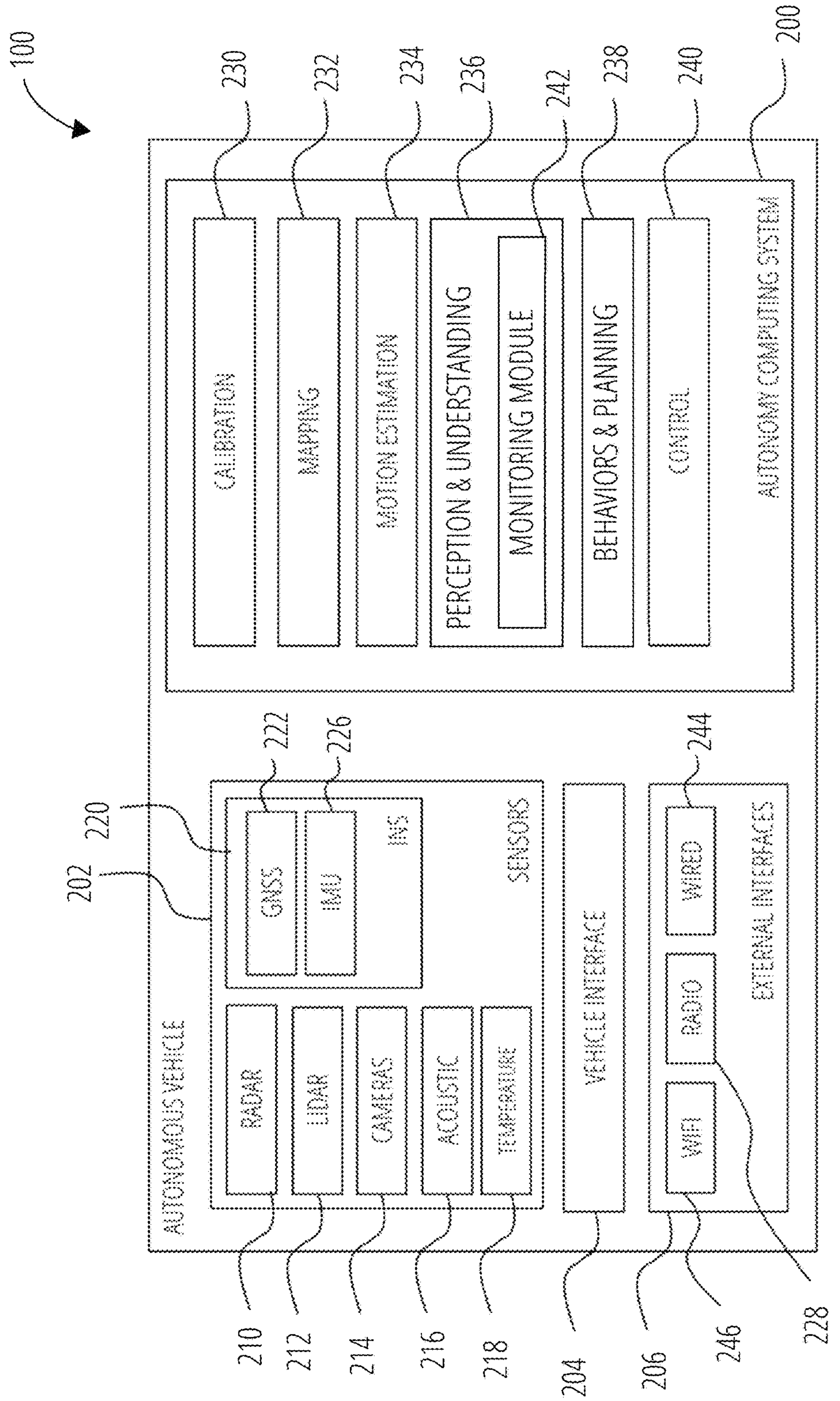
FIG. 2 is a block diagram of the autonomous truck shown in FIG. 1 according to some aspects of the present disclosure.

FIG. 2 is a block diagram of the autonomous truck shown in FIG. 1 according to some aspects of the present disclosure. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218 (e.g., fiber optic cables configured to measure temperature), or inertial navigation system (INS) 220, which may include one or more global navigation satellite system (GNSS) receivers 222 and one or more inertial measurement units (IMU) 226. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 226 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 226 may measure an acceleration, angular rate, or an orientation of autonomous vehicle 100 or one or more of its individual components using a combination of accelerometers, gyroscopes, or magnetometers. IMU 226 may detect linear acceleration using one or more accelerometers and rotational rate using one or more gyroscopes and attitude information from one or more magnetometers. In some embodiments, IMU 226 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 246 or other radios 228. In embodiments including a wireless connection, the connection may be a wireless communication signal (e.g., Wi-Fi, cellular, LTE, 5g, BLUETOOTH®, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a monitoring module 242. The monitoring module 242, for example, may be embodied within another module, such as perception and understanding module 236, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The monitoring module 242 may perform one or more tasks including, but not limited to facilitating the functionality of a monitoring system comprised of one or more components, which may include at least one fiber optic cable, a network terminal, one or more monitoring stations, any combination thereof, or the like. The monitoring module may work in conjunction with one or more other modules within autonomy computing system 200, including, but not limited to, sensors 202, vehicle interface 204, calibration module 230, any combination thereof, or the like.

Figure 3:
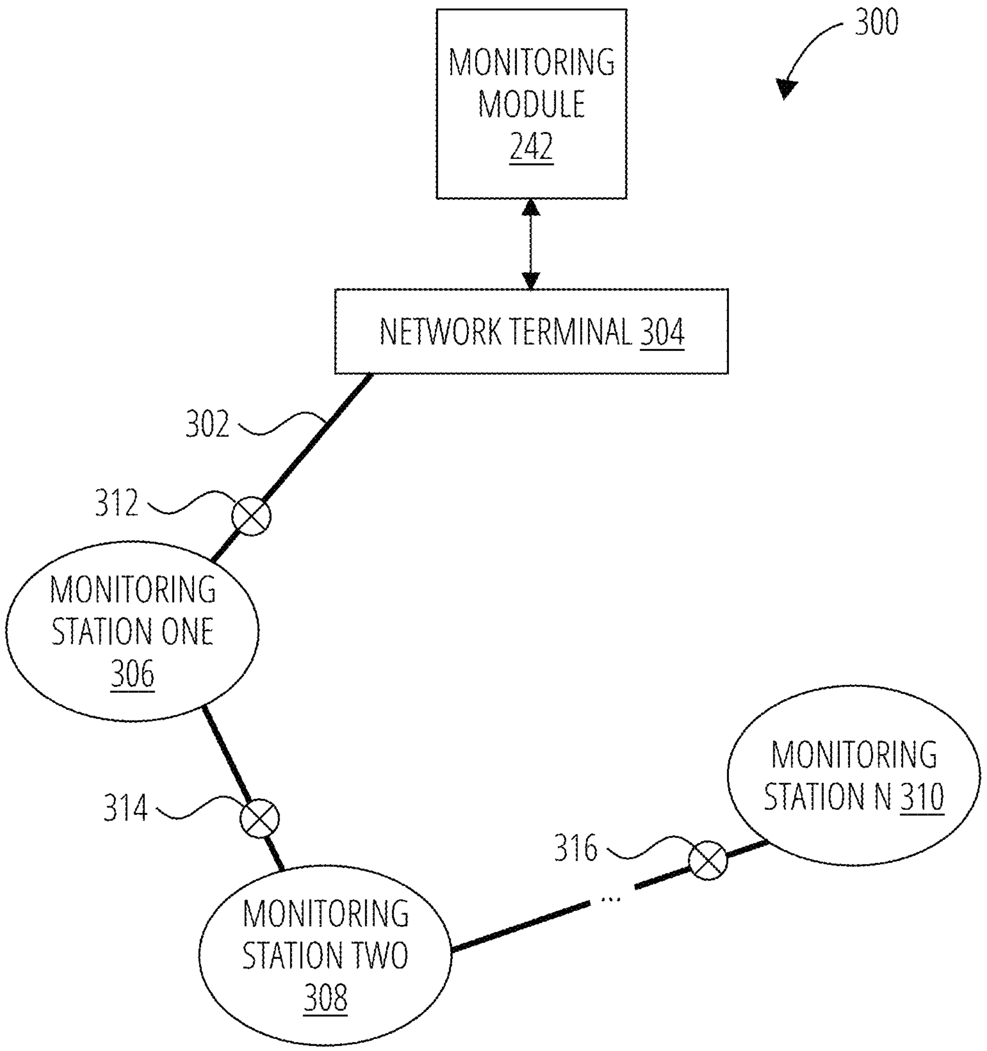
FIG. 3 is a block diagram of one embodiment of a monitoring system according to some aspects of the present disclosure.

FIG. 3 is a block diagram of one embodiment of a monitoring system 300 according to some aspects of the present disclosure. The monitoring system 300 may be associated with an autonomous vehicle (e.g., autonomous vehicle 100 as described in FIG. 1 and FIG. 2). In some examples, the monitoring system 300 may work in conjunction with the computing components described in FIG. 2 to perform operations pertaining to autonomous vehicle 100. In some examples, the monitoring system 300 may be independent from the computing components described in FIG. 2.

Referring to the embodiment shown in FIG. 3, the monitoring system 300 managed by monitoring module 242 includes, but is not limited to, a network terminal 304, a monitoring station one 306, a monitoring station two 308, and a monitoring station N 310. The components discussed in FIG. 3 should not be construed as limiting, and additional components may be included in the monitoring system that are not described in detail herein. For example, there may be additional monitoring stations associated with the monitoring system (e.g., any number of monitoring stations from one to "n" number of monitoring stations, wherein "n" is a whole number greater than or equal to one). Additionally, there may be optical fibers, light sources, optical transmitters, optical fiber cables, optical receivers, optical amplifiers, optical splitters and/or couplers, additional network terminals, any combination thereof, or the like, which may be included in the monitoring system and/or within the components described herein. For example, network terminal 304 may include a light source.

As shown in FIG. 3, network terminal 304, monitoring station one 306, monitoring station two 308, and monitoring station N 310 are connected with a fiber optic cable 302. The fiber optic cable 302 may be a simplex fiber cable, duplex fiber cable, plastic optical fiber cable, single-mode fiber, multimode fiber, any combination thereof, or any other type of fiber-optic cable suitable for sensing and transmitting data. The fiber optic cable 302 may be placed throughout an autonomous vehicle (e.g., autonomous vehicle 100 as described in FIG. 1 and FIG. 2). The fiber optic cable 302 may be placed in the cab, the trailer, under the hood (e.g., near the engine or other components), in computing systems or other hardware, on the roof of the cab, or any other location that may require monitoring within the autonomous vehicle. For example, an administrator (or technician, mechanic, operator, etc.) may place fiber optic cable 302 near and/or around a camera meant to monitor an autonomous vehicle's location within a lane on a street.

In certain embodiments, one or more of monitoring stations 306, 308, and 310 are placed along the fiber optic cable 302. The monitoring stations, e.g., monitoring stations 306, 308, and 310, analyze changes in the light properties, such as intensity, phase, or wavelength, to detect physical changes like temperature, strain, or pressure along the fiber optic cable 302. Monitoring stations 306, 308, and 310 process the sensor data in real-time, capturing detailed information about the environmental conditions or structural integrity being monitored. In certain embodiments, the monitoring stations 306, 308, and 310 transmit data to network terminal 304 for processing and/or forwarding. By using the fiber optic cable 302 as a sensor and monitoring changes in the fiber optic cable 302 using the monitoring stations 306, 308, and 310, the autonomous vehicle can be reliably monitored (e.g., temperature, strain, etc.) at various locations throughout the vehicle. When a temperature and/or strain measurement is too high at one or more points within the vehicle along the fiber optic cable 302, the monitoring system 300 may alert the autonomy computing system, such as autonomy computing system 200 shown in FIG. 2, to initiate some remedial action (e.g., increase power to cooling devices, slow down the vehicle, reduce power to a particular element, any combination thereof, or the like). Continuous monitoring of temperature and/or strain in a reliable manner can increase the lifespan of electronic and/or mechanical devices within the autonomous vehicle, increase safety by minimizing potential malfunctions, and increase efficiency of the vehicle by ensuring that components are functioning correctly.

Monitoring module 242 may be incorporated in autonomy computing system 200 described in FIG. 2. Monitoring module 242 may be configured to facilitate the monitoring system 300 and transmit communications, alarms, data, any combination thereof, or the like, to components within autonomy computing system 200 to ensure proper functionality of the autonomous vehicle. Monitoring module 242 may initiate a monitoring session associated with the monitoring system 300 via a request from autonomy computing system 200, request from an administrator, an indication that the autonomous vehicle has turned on, any combination thereof, or the like. The monitoring session may initiate calibration of monitoring station one 306, monitoring station two 308, and/or monitoring station N 310. Calibration of fiber optic cables, such as fiber optic cable 302, used as sensors includes aligning the sensor outputs with known reference values by applying controlled physical changes, such as temperature or strain, to the fiber. Monitoring stations 306, 308, and 310 record these changes and adjust the sensor readings to ensure accuracy and consistency. This process may involve iterative testing and fine-tuning to account for variations in the fiber's response over different segments and conditions. In some examples, the monitoring system may be calibrated for each monitoring session initiated by monitoring module 242. In some other examples, the monitoring system may be calibrated after a duration of time, after a monitoring session (or one or more cumulative monitoring session) exceed a threshold time, after an event (e.g., an alarm is triggered by the monitoring system), any combination thereof, or the like.

Network terminal 304 may be configured as an interface that connects monitoring station one 306, monitoring station two 308, and monitoring station N 310 with the broader network (e.g., autonomy computing system 200), facilitating the transmission and reception of sensor data. They process the optical signals from the fiber optic cable, converting them into digital data that can be analyzed and acted upon by the monitoring stations. Additionally, network terminals manage communication protocols and ensure seamless data flow between the fiber optic cable and the monitoring infrastructure, enabling real-time monitoring and analysis. For example, network terminal 304 may receive altered optical signals that are transmitted through the fiber optic cable. The fiber optic cable detects physical changes such as temperature, strain, or pressure along its length. These changes affect the light properties (e.g., intensity, phase, or wavelength) traveling through the fiber. Network terminal 304 may receive the altered optical signals and convert them into digital data, which may represent the detected physical changes in the autonomous vehicle. The digital data may be transmitted from network terminal 304 to respective monitoring stations (e.g., digital data associated with an area within a threshold distance of monitoring station one 306 may be transmitted to monitoring station one 306). The transmission may occur over the fiber optic cable or via a separate communication channel.

Monitoring station one 306, monitoring station two 308, and/or monitoring station N 310 may receive digital data from network terminal 304. The digital data may include location data relative to a position along the continuous fiber optic cable 302. The location data may dictate which monitoring station the digital data is directed to from the network terminal 304. For example, digital data associated with a location 314 may be directed to monitoring station two 308, digital data associated with a location 312 may be directed to monitoring station one 306, and digital data associated with a location 316 may be directed monitoring station N 310. The monitoring stations 306, 308, and 310 receive the digital data and analyze it to determine specific environmental (e.g., temperature) and/or structural (e.g., strain) changes detected by the fiber optic cable 302. The monitoring stations 306, 308, and 310 interpret the digital data to identify issues like structural strain, temperature changes, or pressure variations. In some examples, the digital data received by a monitoring station may not be dependent on location but may be dependent on the type of processing required. For example, monitoring station one 306 may be configured to process digital data for less-sensitive equipment, such as engines and some computing components, and monitoring station two 308 may be configured to process digital data for more sensitive equipment, like cameras and IMUs.

In some examples, monitoring station one 306, monitoring station two 308, and/or monitoring station N 310 may detect one or more anomalies (e.g., values outside of acceptable thresholds) within the digital data. Monitoring station one 306, monitoring station two 308, and/or monitoring station N 310 may transmit an alert and/or initiate further diagnostic procedures associated with a particular area along the fiber optic cable 302. For example, if a temperature identified at location 312 (e.g., a location associated with a CPU) is too high (e.g., higher than 70° C.), monitoring station one 306 may transmit an alert to network terminal 304, and network terminal 304 may forward the alert to monitoring module 242. The thresholds for the digital data at monitoring stations 306, 308, and 310 can be established by the calibration that can occur at the initiation of the monitoring session, received from autonomy computing system 200 via monitoring module 242 (e.g., input by an operator, administrator, technician, maintenance personnel, etc.), industry and/or regulatory standards associated with the autonomous vehicle and/or hardware on the autonomous vehicle, any combination thereof, or the like.

In some examples, locations along the fiber optic cable 302 may be associated with a status at network terminal 304 and/or monitoring module 242. For example, cameras, computer components, engines, or other components of the autonomous vehicle may be stored in association with a location along the fiber optic cable 302 and a status, such as "normal," "low," "high," "warning," "hazardous," "urgent," any combination thereof, or the like. Monitoring module 242 may update the status of one or more components associated with the autonomous vehicle based on data from network terminal 304 and may transmit warnings accordingly to autonomy computing system 200. The framework for providing warnings and updating the status of one or more components associated with the autonomous vehicle may be determined by an administrator of the autonomy computing system 200 and/or the monitoring system. The framework may also include thresholds for individual components within the autonomous vehicle and the thresholds may be transmitted to monitoring stations 306, 308, or 310.

In certain embodiments, the fiber optic cable 302 may be run along a chassis of the autonomous vehicle. For example, the fiber optic cable 302 may be placed below the cab, from the front wheels to the rear wheels, around the rear of the cab, then back along the other side of the chassis. In certain embodiments, multiple fiber optic cables 302 may be placed along different angles of the chassis (e.g., above the chassis, below the chassis, and outside the chassis). Network terminal 304 receives data from the fiber optic cable 302 and transmits the data to a particular monitoring station (e.g., monitoring station one 306, monitoring station two 308, and/or monitoring station N 310). In certain embodiments, the monitoring station, e.g., monitoring station one 306, generates a three-dimensional (3D) model of the chassis based on the data. In certain embodiments, the 3D model is generated by monitoring module 242 and transmitted to autonomy computing system 200 for distribution (e.g., to remote servers and/or devices associated with the autonomous vehicle).

Figure 4:
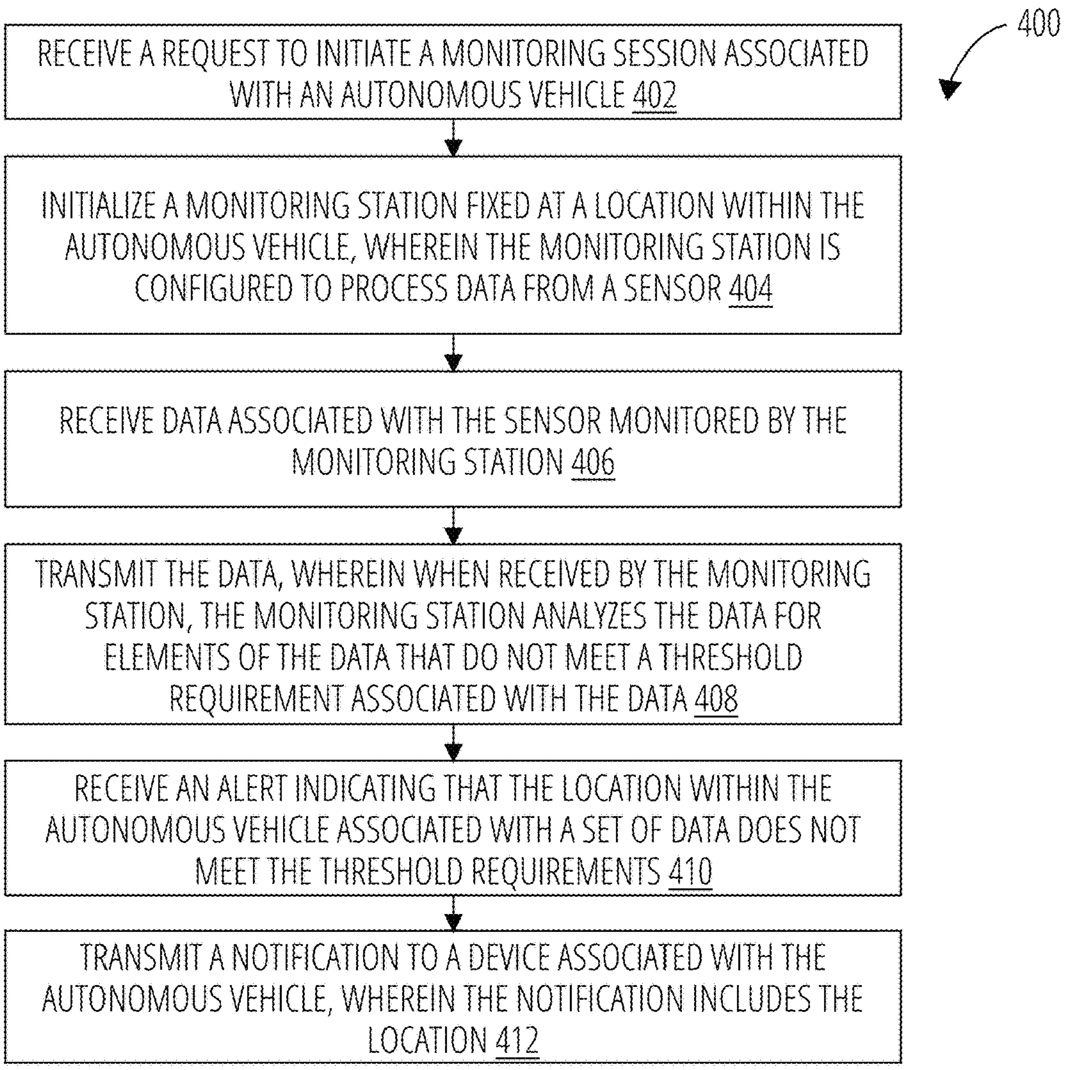
FIG. 4 is a flowchart of an embodiment method for monitoring locations in a vehicle using a monitoring system according to some aspects of the present disclosure.

FIG. 4 is a flowchart of an embodiment method 400 for monitoring locations in a vehicle using a monitoring system, such as monitoring system 300 shown in FIG. 3, according to some aspects of the present disclosure. Although the method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving 402 a request to initiate a monitoring session associated with an autonomous vehicle. For example, the network terminal 304 (shown in FIG. 3) may receive 402 the request to initiate the monitoring session. The vehicle may be an autonomous vehicle as described in FIG. 1 and FIG. 2. In certain embodiments, the request may be received from autonomy computing system 200 (shown in FIG. 2) based on an external trigger (e.g., the vehicle ignition, an external temperature reading, a duration of time, other sensor data reaching a threshold value, any combination thereof, or the like). In certain embodiments, the request may be triggered by a transmission from an external device, such as a remote server and/or computing device managed by an operator, administrator, maintenance personnel, mechanic, any combination thereof, or the like.

The method 400 includes initializing 404 a monitoring station fixed at a location within the autonomous vehicle, wherein the monitoring station is configured to process data from a sensor. For example, network terminal 304 (shown in FIG. 3) may initialize 404 monitoring station one 306 (shown in FIG. 3) configured to process data from a sensor. In certain embodiments, the sensor may include a fiber optic cable (e.g., fiber optic cable 302 shown in FIG. 3) and the monitoring station is fixed along the fiber optic cable. The fiber optic cable may be any variety of fiber optic cable configured to function as a sensor and monitor one or more aspects of an autonomous vehicle (e.g., temperature, strain, pressure, etc.).

In certain embodiments, a monitoring system may require calibration before accurately monitoring an autonomous vehicle. The method may further include receiving calibration data associated with the fiber optic cable and calibrating the fiber optic cable and the monitoring station based on the calibration data. The calibration data may be based on prior monitoring sessions, initial input from the fiber optic cable, external data, any combination thereof, or the like.

In some examples, the fiber optic cable may include one or more points of interest over a length of the fiber optic cable, wherein the points of interest are associated with a distance from at least one monitoring station. The one or more points of interest may be associated with particular components associated with the autonomous vehicle, including, but not limited to, cameras (e.g., LWIR cameras), engine components, IMUs, computing systems, any combination thereof, or the like. These components may be stored in association with a relative location along the fiber optic cable in a location accessible by the monitoring system (e.g., by monitoring module 242, monitoring station one 306, monitoring station two 308, monitoring station N 310, and/or network terminal 304 as shown in FIG. 2 and FIG. 3). In certain embodiments, the method may further include generating a monitoring framework for the one or more points of interest, wherein the monitoring framework includes a measurement threshold associated with a respective point of interest and the distance associated with the respective point of interest. The monitoring framework may dictate the upper and lower limits for a particular measurement associated with the relative location along the fiber optic cable. This monitoring framework may also be stored in association with the relative location in a location accessible by the monitoring system.

Method 400 includes receiving 406 data associated with the sensor monitored by the monitoring station. For example, network terminal 304 (shown in FIG. 3) may receive 406 data associated with the sensor monitored by monitoring station one 306 (shown in FIG. 3). The monitoring system may process the data (e.g., optical signals) from the sensor (e.g., the fiber optic cable) and convert the data into digital data. In certain embodiments, the data may be indicative of a temperature, a strain measurement, and/or a pressure measurement.

Method 400 includes transmitting 408 the data, wherein when received by the one or more monitoring stations, the monitoring stations analyze the data for elements of the data that do not meet a threshold requirement associated with the data. For example, network terminal 304 (shown in FIG. 3) may transmit 408 the data, wherein when received by monitoring station one 306 (shown in FIG. 3), monitoring station one 306 may analyze the data for elements of data that do not meet the threshold requirement associated with the data. For example, the monitoring system may identify an anomaly in the data that may indicate a potential issue within one of the components of the autonomous vehicle.

Method 400 includes receiving 410 an alert indicating that the location within the autonomous vehicle associated with a set of data does not meet the threshold requirements. For example, monitoring station one 306 (shown in FIG. 3) may transmit the alert to network terminal 304 (shown in FIG. 3) indicating that the location within autonomous vehicle 100 (shown in FIG. 1) associated with the set of data does not meet the threshold requirements. The threshold requirements may be determined according to the monitoring framework stored in association with the relative location.

Method 400 includes transmitting 412 a notification to a device associated with the autonomous vehicle, wherein the notification includes the location. For example, network terminal 304 (shown in FIG. 3) may transmit 412 the notification to monitoring module 242 (shown in FIG. 2 and FIG. 3), where the notification may include the location. The monitoring module may forward the notification to a computing module (e.g., autonomy computing system 200 shown in FIG. 2). The computing module may initiate mitigation procedures associated with the location, such as reducing a speed, increasing power to fans, modifying directions associated with a route of the autonomous vehicle, transmitting a notification to a remote device associated with an administrator, any combination thereof, or the like. In certain embodiments, the monitoring module may generate one or more models (e.g., graphs, diagrams, databases, spreadsheets, predictions, 3D renderings, 2D renderings, images, any combination thereof, or the like) associated with data received from the monitoring system. The one or more models may be output to external databases and/or other external devices for further processing and/or distribution.

Figure 5:
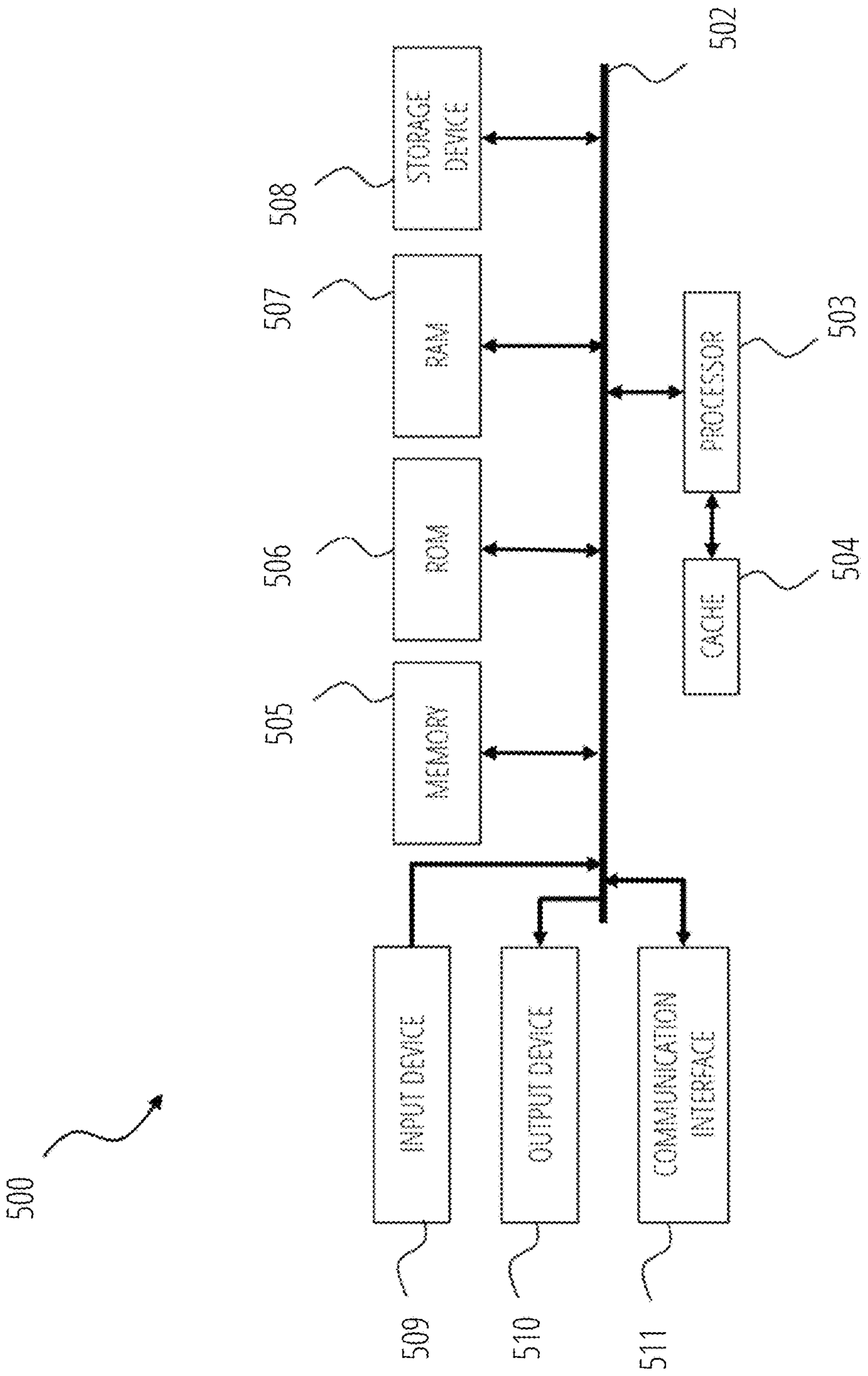
FIG. 5 is a block diagram of an example computing system for executing a monitoring system according to some aspects of the present disclosure.

FIG. 5 is a block diagram of an example computing system for executing a monitoring system according to some aspects of the present disclosure. FIG. 5 illustrates an example computing system 500 that can implement various techniques, processes, functions, or methods described herein. The components of computing system 500 are shown in electrical communication with each other using a connection 502, such as a bus. The example computing system 500 includes a processing unit (or processor) 503 and a computing device connection 502 that couples various computing device components, including computing device memory 505, such as a read only memory ROM 506 and a random-access memory RAM 507, to processor 503.

Computing system 500 can include a cache 504 of high-speed memory connected directly with, in close proximity to, or integrated as part of processor 503. Computing system 500 can copy data from memory 505 and/or storage device 508 to cache 504 for quick access by processor 503. In this way, cache 504 can provide a performance boost that avoids processor 503 delays while waiting for data. These and other modules can control or be configured to control processor 503 to perform various actions. Other computing device memory 505 may be available for use as well. Memory 505 can include multiple different types of memory with different performance characteristics. Processor 503 can include any general-purpose processor, central processing unit (CPU), or graphics processing unit (GPU) in combination with a hardware or software provision configured to control processor 503 and stored in storage device 508, as well as any special-purpose processor where software instructions are incorporated into the processor design. Processor 503 may be a self-contained system, containing multiple cores or processors, a bus, memory controller, cache, etc. A multi-core processor may be symmetric or asymmetric.

Storage device 508 is a non-volatile memory and can be one or more of a hard disk or other types of computer readable media that can store data that are accessible by a computer, such as a magnetic cassette, flash memory card, solid state memory device, digital versatile disk, cartridge, RAM 507, ROM 506, or hybrids thereof. Memory 505 or storage device 508 can include software, code, firmware, etc., for controlling processor 503. Other hardware or software modules are contemplated. Memory 505 and storage device 508 are connected to computing device connection 502. In one aspect, a hardware module that performs a particular function can include the software component stored in a computer-readable medium in connection with the necessary hardware components, such as processor 503, computing device connection 502, and so forth, to carry out the function. In the example embodiment, processor 503 may be programmed by encoding an operation or function using one or more executable instructions and providing the executable instructions in memory 505 or storage device 508.

To enable user interaction, computing system 500 includes an input device 509, which can represent any number of input mechanisms, such as a microphone for speech, a touch-sensitive screen for gesture or graphical input, keyboard, mouse, motion input, speech, etc. Computing system 500 can also include output device 510, which can be one or more of a number of output mechanisms known to those of skill in the art. In some instances, multimodal systems can enable a user to provide multiple types of input/output to communicate with computing system 500. Computing system 500 can include communication interface 511, which can generally govern and manage the user input and system output. There is no restriction on operating on any particular hardware arrangement, and therefore the basic features here may easily be substituted for improved hardware or firmware arrangements as they are developed.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) reducing the likelihood of a hardware malfunction by providing consistent and accurate monitoring of components, (b) simplifying and streamlining the monitoring process by requiring minimal equipment and setup, (c) increasing the efficiency of an autonomous vehicle by catching potential malfunctions before they become detrimental to the functionality of the autonomous vehicle, thereby reducing potential downtime due to a malfunction, and (d) ease of integration into existing systems.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A method for monitoring environmental condition changes within an autonomous vehicle using a monitoring system, the method comprising:

receiving a request to initiate a monitoring session associated with an autonomous vehicle;

initializing a monitoring station disposed within the autonomous vehicle, wherein the monitoring station is configured to process data from a sensor, wherein the sensor is a fiber optic cable;

receiving data associated with the sensor monitored by the monitoring station;

transmitting the data, wherein when received by the monitoring station, the monitoring station analyzes the data for elements of the data that do not meet a threshold requirement associated with the data based on one or more altered optical signals in the fiber optic cable due to an environmental change in temperature, strain, pressure, vibration, or combinations thereof;

converting the one or more altered optical signals into digital data representative of the environmental change and a location of the environmental change along the fiber optic cable; and initiating a change in operation of the autonomous vehicle to mitigate the environmental change.

2. The method of claim 1, wherein the monitoring station is fixed within the autonomous vehicle at a location along the fiber optic cable.

3. The method of claim 1, wherein the fiber optic cable includes one or more points of interest over a length of the fiber optic cable, wherein the points of interest are associated with a distance from the monitoring station.

4. The method of claim 3, further comprising:

generating a monitoring framework for the one or more points of interest, wherein the monitoring framework includes a measurement threshold associated with a respective point of interest and the distance associated with the respective point of interest.

5. The method of claim 1, further comprising:

receiving calibration data associated with the fiber optic cable; and calibrating the fiber optic cable and the monitoring station based on the calibration data.

6. The method of claim 1, wherein the change in the operation of the autonomous vehicle includes (i) reducing a speed of the autonomous vehicle, (ii) increasing power to a cooling fan of the autonomous vehicle, (iii) initiating a heat mitigation tactic for the autonomous vehicle, (iv) modifying a direction associated with a route of the autonomous vehicle, or combinations thereof.

7. A system, comprising:

one or more processors;

a sensor monitored by a monitoring station, wherein the monitoring station is configured to process data from the sensor, and wherein the sensor is a fiber optic cable; and a memory storing instructions that, when executed by the one or more processors, configure the system to:

receive a request to initiate a monitoring session associated with an autonomous vehicle;

initialize the monitoring station disposed within the vehicle;

receive data associated with the sensor monitored by the monitoring station;

transmit the data, wherein when received by the monitoring station, the monitoring station analyzes the data for elements of the data that do not meet a threshold requirement associated with the data based on one or more altered optical signals in the fiber optic cable due to an environmental change in temperature, strain, pressure, vibration, or combinations thereof;

convert the one or more altered optical signals into digital data representative of the environmental change and a location of the environmental change along the fiber optic cable; and initiate a change in operation of the autonomous vehicle to mitigate the environmental change.

8. The system of claim 7, wherein the monitoring station is fixed within the autonomous vehicle at a location along the fiber optic cable.

9. The system of claim 7, wherein the fiber optic cable includes one or more points of interest over a length of the fiber optic cable, wherein the points of interest are associated with a distance from the monitoring station.

10. The system of claim 9, wherein the instructions further configure the system to:

generate a monitoring framework for the one or more points of interest, wherein the monitoring framework includes a measurement threshold associated with a respective point of interest and the distance associated with the respective point of interest.

11. The system of claim 7, wherein the instructions further configure the system to:

receive calibration data associated with the fiber optic cable; and calibrate the fiber optic cable and the monitoring station based on the calibration data.

12. The system of claim 7, wherein the change in the operation of the autonomous vehicle includes (i) reducing a speed of the autonomous vehicle, (ii) increasing power to a cooling fan of the autonomous vehicle, (iii) initiating a heat mitigation tactic for the autonomous vehicle, (iv) modifying a direction associated with a route of the autonomous vehicle, or combinations thereof.

13. A non-transitory computer-readable storage medium, the computer-readable storage medium including instructions that when executed by a computer, cause the computer to:

receive a request to initiate a monitoring session associated with an autonomous vehicle;

initialize a monitoring station disposed within the autonomous vehicle, wherein the monitoring station is configured to process data from a sensor, and wherein the sensor is a fiber optic cable;

receive data associated with the sensor monitored by the monitoring station;

transmit the data, wherein when received by the monitoring station, the monitoring station analyzes the data for elements of the data that do not meet a threshold requirement associated with the data based on one or more altered optical signals in the fiber optic cable due to an environmental change in temperature, strain, pressure, vibration, or combinations thereof;

convert the one or more altered optical signals into digital data representative of the environmental change and a location of the environmental change along the fiber optic cable; and initiate a change in operation of the autonomous vehicle to mitigate the environmental change.

14. The non-transitory computer-readable storage medium of claim 13, wherein the monitoring station is fixed within the autonomous vehicle at a location along the fiber optic cable.

15. The non-transitory computer-readable storage medium of claim 13, wherein the fiber optic cable includes one or more points of interest over a length of the fiber optic cable, wherein the points of interest are associated with a distance from at least one monitoring station.

16. The non-transitory computer-readable storage medium of claim 15, wherein the instructions further configure the computer to:

generate a monitoring framework for the one or more points of interest, wherein the monitoring framework includes a measurement threshold associated with a respective point of interest and the distance associated with the respective point of interest.

17. The non-transitory computer-readable storage medium of claim 13, wherein the change in the operation of the autonomous vehicle includes (i) reducing a speed of the autonomous vehicle, (ii) increasing power to a cooling fan of the autonomous vehicle, (iii) initiating a heat mitigation tactic for the autonomous vehicle, (iv) modifying a direction associated with a route of the autonomous vehicle, or combinations thereof.

* * * * *